March 11, 1952 N. T. ALMQUIST ET AL 2,589,185
MACHINE FOR REPROCESSING PHONOGRAPH RECORD DISKS
Filed July 15, 1949 8 Sheets-Sheet 1

INVENTORS
NILS T. ALMQUIST
ANTHONY C. DeNAPOLI, JR.
BY
H. G. Manning
ATTORNEY

March 11, 1952 N. T. ALMQUIST ET AL 2,589,185
MACHINE FOR REPROCESSING PHONOGRAPH RECORD DISKS
Filed July 15, 1949 8 Sheets-Sheet 4

INVENTORS
NILS T. ALMQUIST
ANTHONY C. DeNAPOLI, JR
BY
H. G. Manning
ATTORNEY

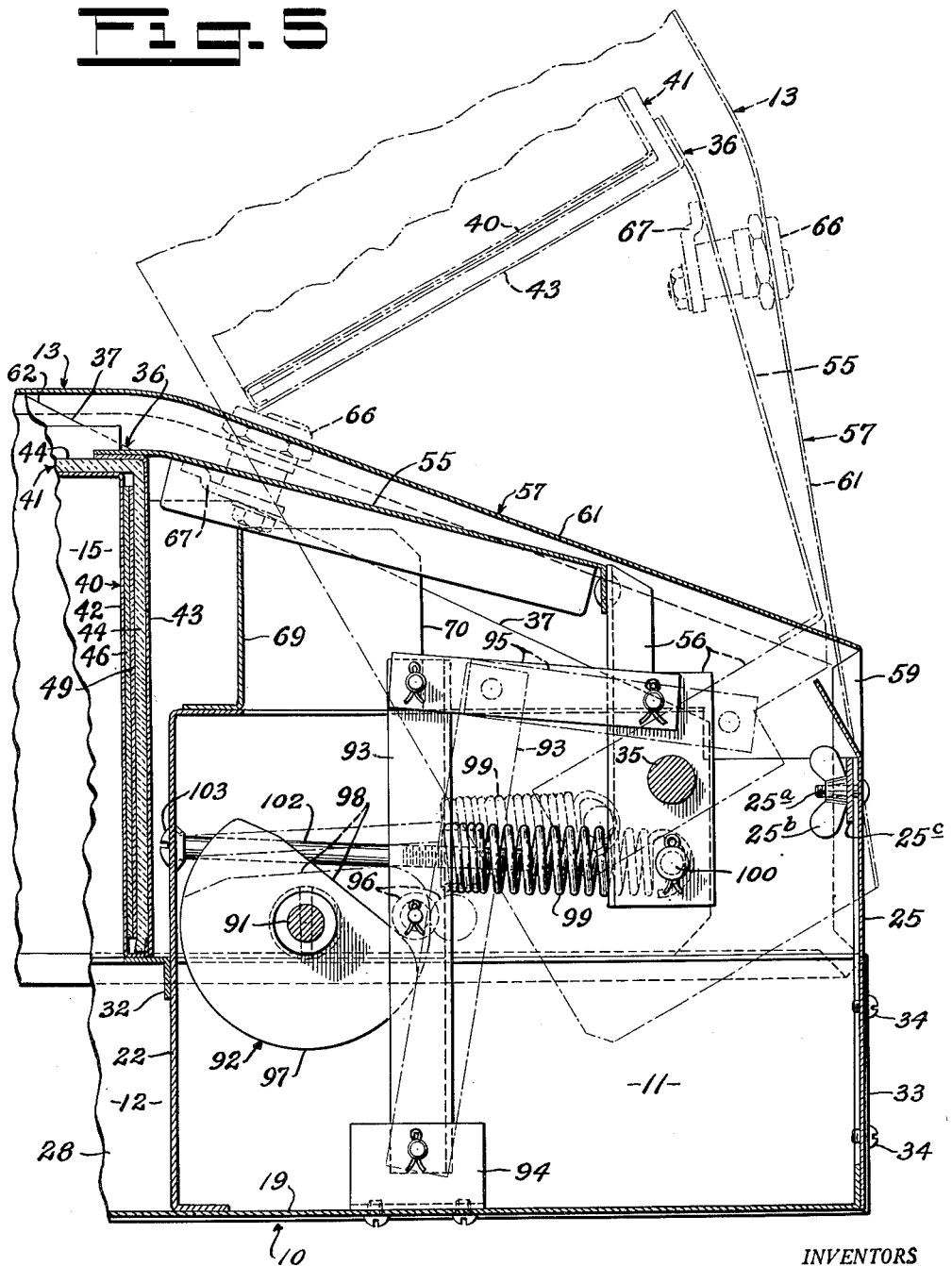

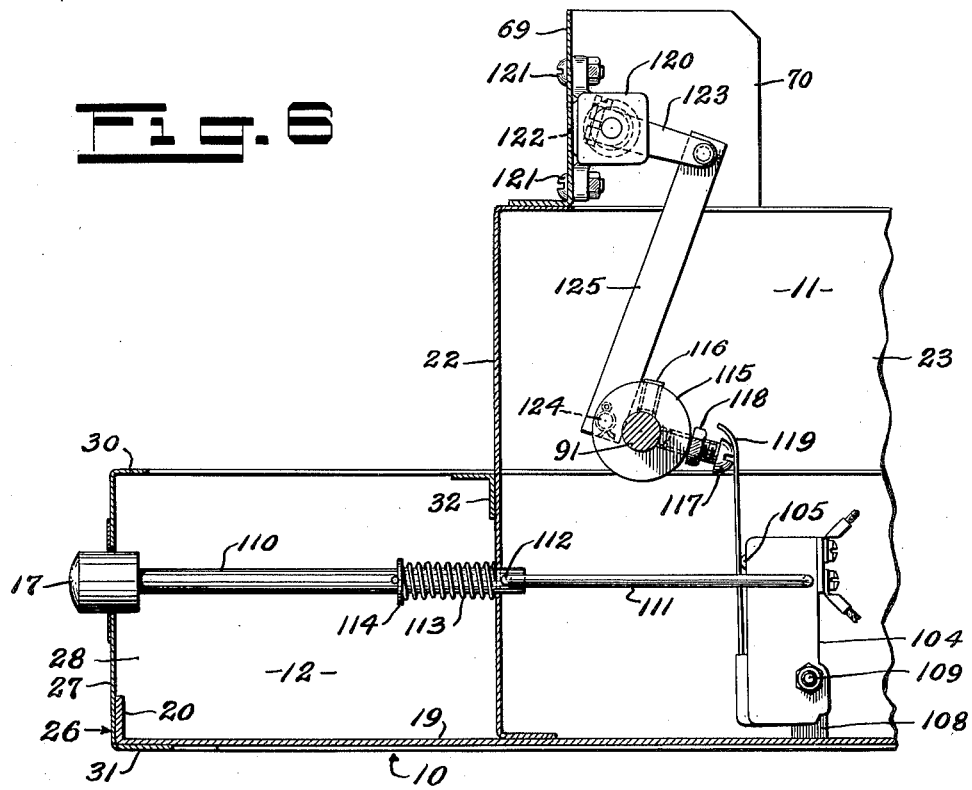
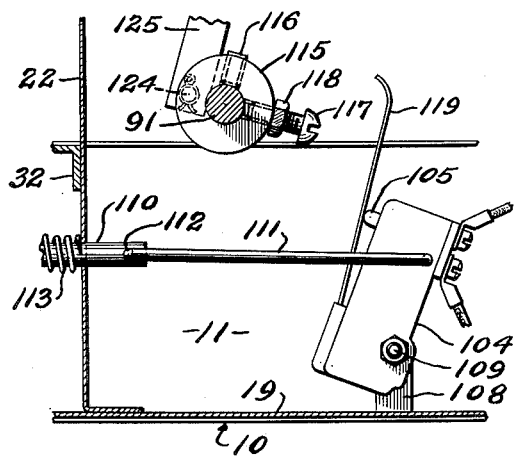
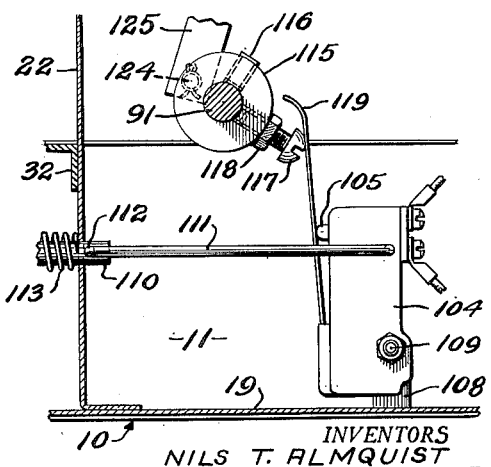

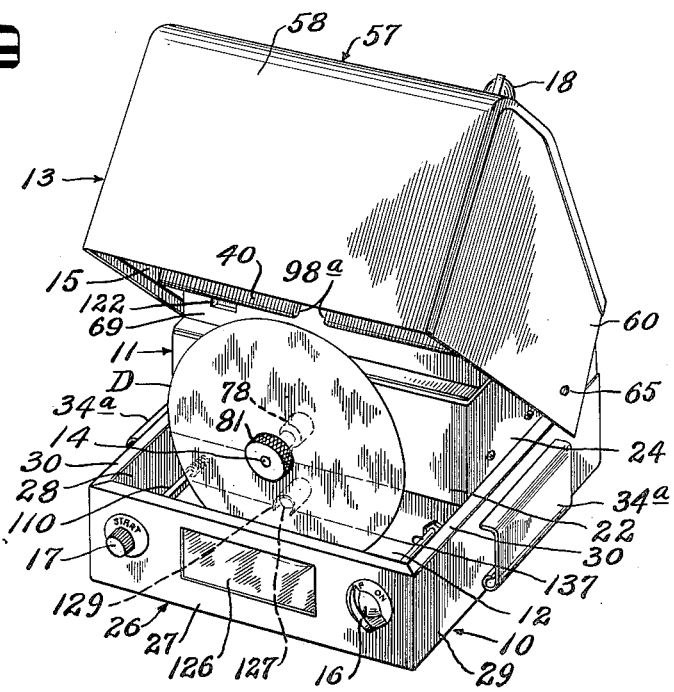
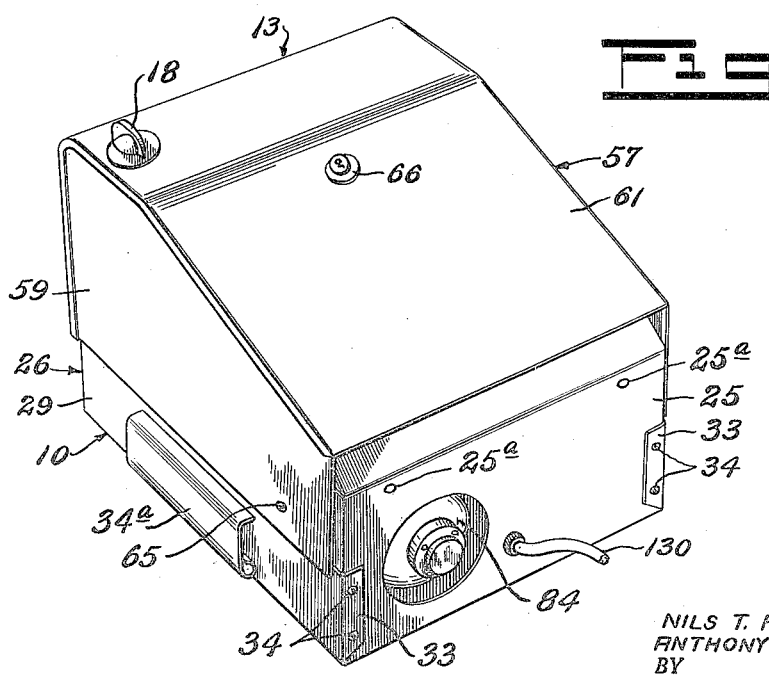

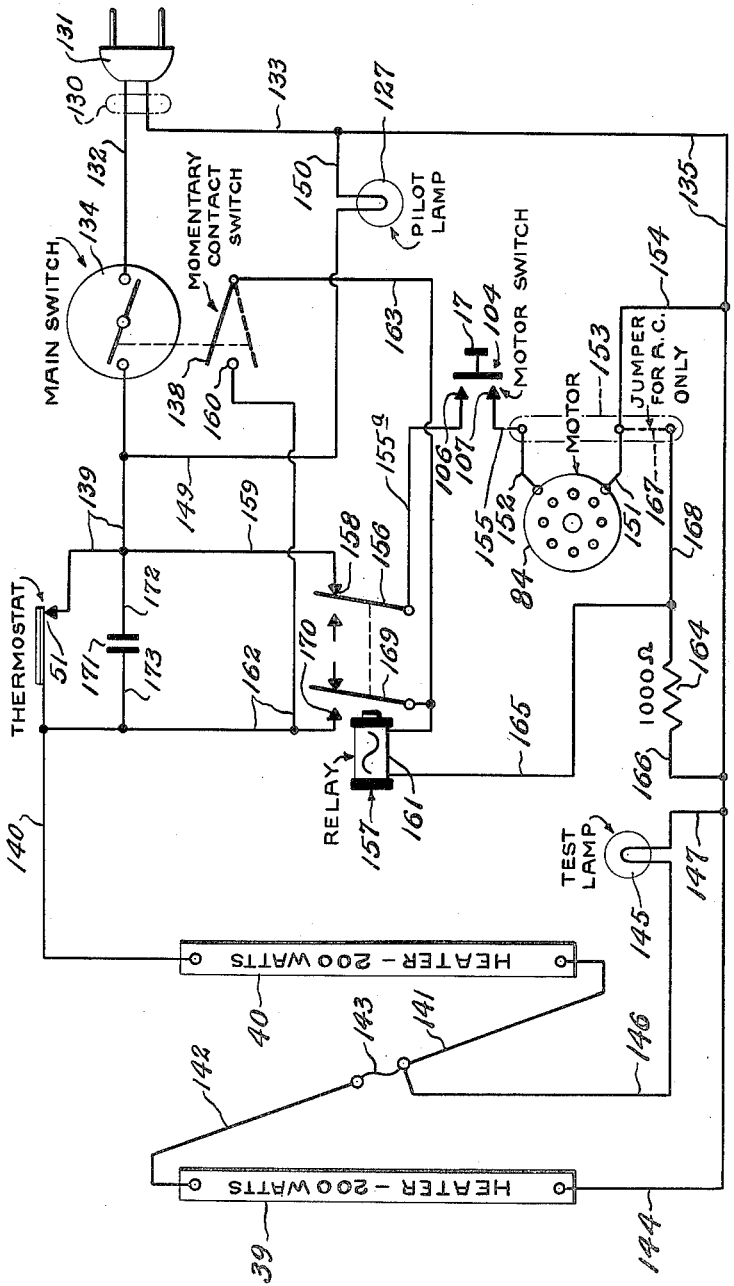

Patented Mar. 11, 1952

2,589,185

UNITED STATES PATENT OFFICE 2,589,185

MACHINE FOR REPROCESSING PHONOGRAPH RECORD DISKS

Nils T. Almquist, New Britain, and Anthony C. De Napoli, Jr., Windsor, Conn., assignors to The Soundscriber Corporation, New Haven, Conn., a corporation of Connecticut Application July 15, 1949, Serial No. 105,004

6 Claims. (Cl. 18—5.3)

This invention relates to machines for reprocessing phonographic record disks, and more particularly to a machine for restoring used phonographic record disks to a substantially new and blank condition in which they will again be suitable for receiving new recordings.

The machine herein disclosed will be found particularly useful for carrying out the process disclosed in the Patent Number 2,539,717, to Donald F. Balmer, issued January 30, 1951, entitled Reprocessing Phonograph Record Disks, and constitutes an improved form of the apparatus described therein.

The above-mentioned Balmer process is applicable to record disks composed of or having a surface layer of any plastic material which is capable of strain relief without melting when heated to a practicable temperature, and in which material record grooves have been impressed, indented, or embossed while the material is in a solid state and without appreciable cutting or breaking of the material. One example of such a material is a copolymer of vinyl chloride and vinyl acetate, known as Vinylite.

Broadly speaking, the process includes the step of heating each disk to a temperature which is below the melting point and at which strains produced in the material by the recording operation will be relieved, whereby the record grooves will be obliterated; and the step of spinning the disk about its normal axis during and after said heating step, whereby the disk will cool and set in a flat condition. Creases or other deformations which may have been accidentally imparted to the disks will also be eliminated during the process, providing the material has not actually been broken.

The machine which is the subject of the present application will also be capable of restoring disks of the above-mentioned type of material having permanent molded or cut grooves in which a sound track of wave form has subsequently been impressed. The machine will not, of course, eliminate the grooves from such disks, but will obliterate the sound track so that the restored disks will have blank grooves which may again be impressed with new sound tracks.

One object of the present invention is to provide an improved machine for efficiently performing the above-mentioned process.

Another object is to provide a machine of the above nature in which a record reprocessing cycle will be automatically completed after being manually initiated.

Another object is to provide a machine of the above nature which may be operated conveniently, safely, and with a minimum of attention on the part of the operator.

Another object is to provide a machine of the above nature which is adapted to obliterate sound tracks from one or both sides of record disks without producing any substantial deformations therein, whereby no subsequent operations will be necessary in order to place the disks in a useable condition.

A further object is to provide a machine of the above nature which will be simple in construction, economical to manufacture, and operate, easy to install and manipulate, compact, ornamental in appearance, and very efficient and durable in use.

With these and other objects in view there has been illustrated on the accompanying drawings one form in which the invention may conveniently be embodied in practice.

In the drawings,

Fig. 5 is a cross-sectional view, taken on the line 5—5 of Fig. 4, showing the cover-operating mechanism—parts of the machine being omitted in the interest of clarity.

Fig. 6 is a partial cross-sectional view, taken approximately on the line 6—6 of Fig. 4, showing the motor switch in the position it occupies when the machine cover is closed and the switch contacts are open, and also showing the cycle counter.

Figs. 7 and 8 are partial cross-sectional views similar to Fig. 6, but showing the motor switch in the positions it occupies respectively when the starting button is pressed to close the contacts for starting the machine cycle, and when the contacts are about to be opened at the end of the machine cycle.

Fig. 9 is a front perspective view of the machine as it would appear with the cover open, and showing a record disk in reprocessing position therein.

Fig. 10 is a rear perspective view of the machine as it would appear with the cover closed.

Fig. 11 is a diagram of the electrical circuits of the machine.

Figure 1:
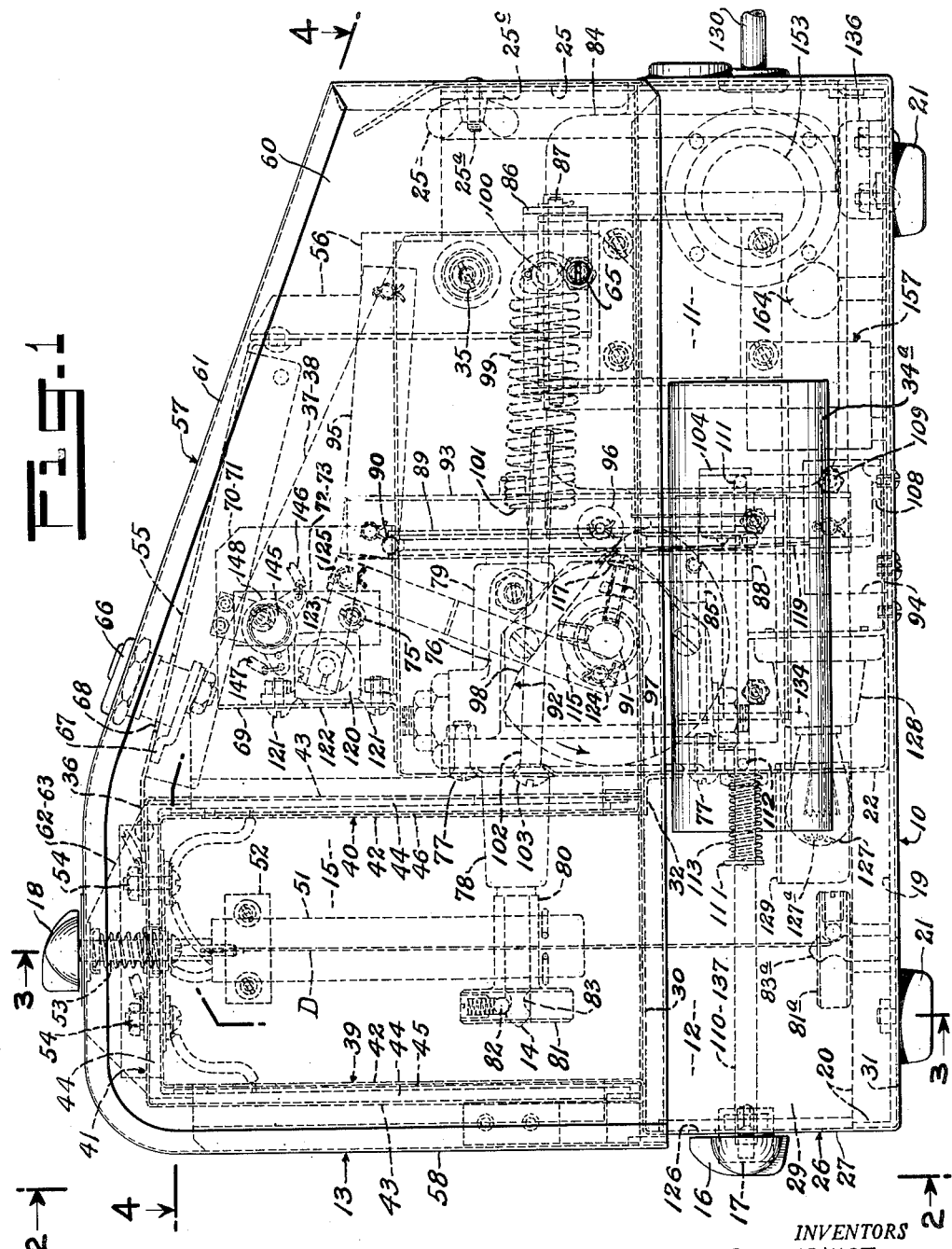
Fig. 1 is a side view of the improved record disk reprocessing machine, showing in broken lines portions of the interior mechanism thereof.

The basic parts of the machine will first be described with reference to the process, after which a detailed description of the machine will be given.

Referring now to the drawing, in which like reference numerals denote corresponding parts throughout the several views, the numeral 10 (Figs. 9 and 10) indicates a main body portion which has a rear compartment 11 containing the necessary operating mechanism, and a relatively shallow open-topped forward compartment or well 12. The body portion 10 also has a vertically swingable cover 13 which is adapted to close the well 12, and which covers the rear compartment 11 at all times.

In order to support a thin record disk D which is to be reprocessed, provision is made of a rotatable horizontal spindle 14 which is inserted in a central aperture of the disk D and which projects forwardly from the rear compartment 11 in such a position as to hold the disk D in a vertical plane with its lower portion disposed in the well 12. The upper and central portions of the disk D will be so disposed as to be received within a heating chamber 15 in the forward portion of the cover 13 when said cover is closed. Thus, it will be seen that the disk D is adapted to be completely enclosed in a large chamber formed by the heating chamber 15 and the well 12.

The front of the body portion 10 is provided with a main switch knob 16 for initially energizing the machine, and a starting button 17 for initiating a reprocessing cycle of the machine.

When the disk D is in position upon the spindle 14 and the machine is in condition for operation, pressure upon the starting button 17 will start a continuous rotation of the spindle 14 so as to spin the disk D rapidly and thus maintain the latter in a flat condition, and will also cause the cover 13 to close so that the heating chamber 15 will embrace a major portion of the disk D.

After a predetermined time interval, which is sufficient to permit the heating chamber 15 to relieve internal strains in the disk D and thus obliterate the grooves or sound tracks therefrom, the machine will operate automatically to open the cover 13, removing the heating chamber from the disk D, and permitting the latter to cool while the rotation of the spindle 14 is continued. At the end of another time interval, which is sufficient to permit the disk D to cool and regain its original self-supporting condition, the rotation of the spindle will be automatically terminated, and the machine cycle will be ended.

Excepting for a brief initial warm-up period, the heating chamber 15 will be maintained at operating temperature during the entire time that the main switch knob 16 is turned on. However, the temperature in the chamber 15 may be adjusted by means of a temperature control knob 18 on the cover 13, as will be further described hereinafter.

*Body portion*

The body portion 10 comprises a base plate 19 which has an upstanding peripheral flange 20, and which also has a plurality of resilient feet 21 secured to its lower surface. In order to enclose the rear compartment 11, the base plate 19 is provided with a vertical transverse wall 22 at the front of said compartment, and a pair of side walls 23, 24 whcih are set inwardly a short distance from the respective side edges of the base plate 19 and terminate substantially flush with the rear edge of said base plate.

The rear of the compartment 11 is closed by a removable back plate 25, the upper portion of which is provided with a pair of threaded interior studs 25a having wing nuts 25b, whereby said back plate may be secured to a cross bar 25c attached to the rear ends of the compartment side walls 23, 24 (Figs. 1 and 4), in such a manner as to prevent removal of the back plate 25 from the outside of the machine.

Figure 3:
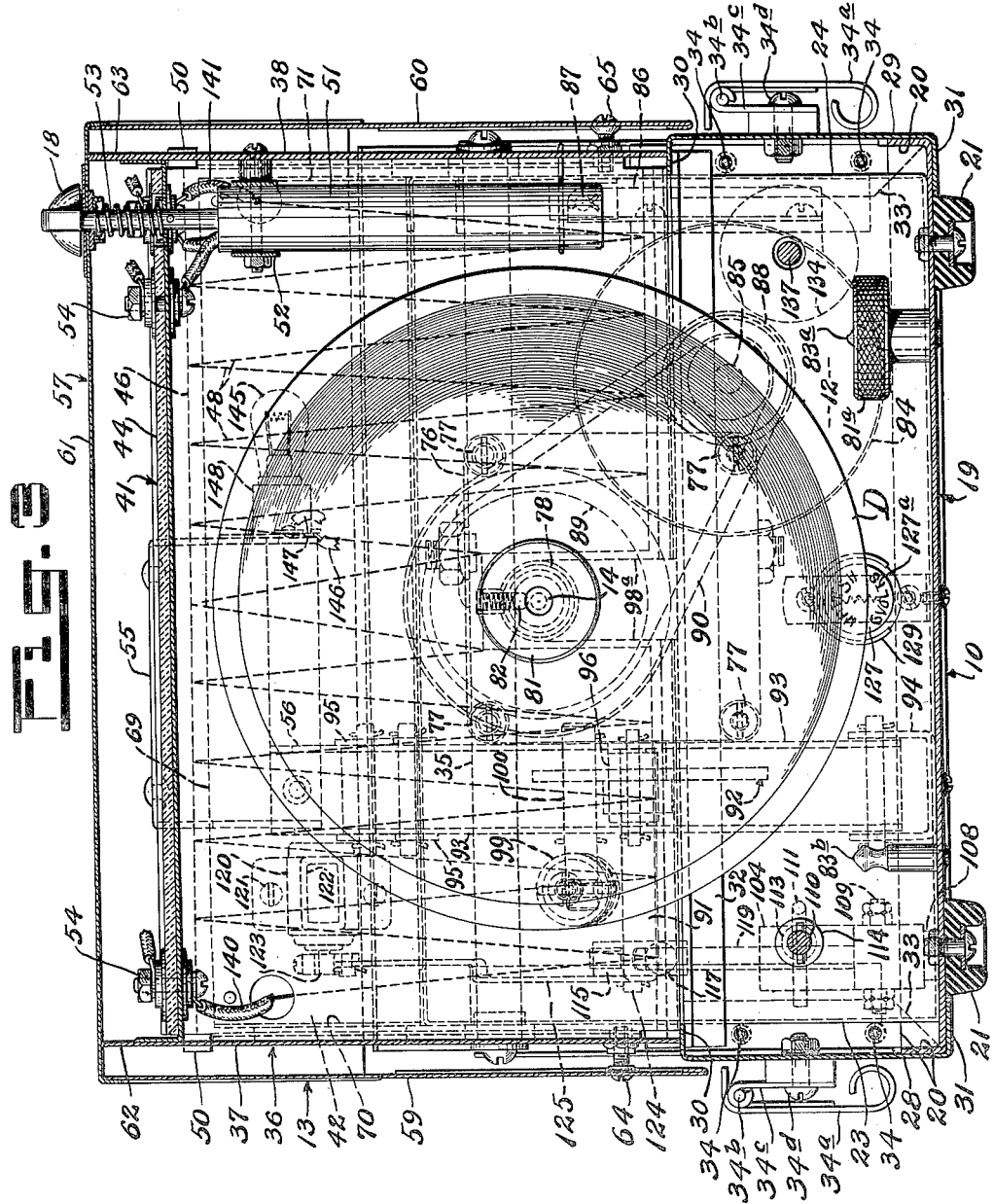
Fig. 3 is a cross-sectional view, taken through the heating chamber, on the line 3—3 of Fig. 1.
Figure 4:
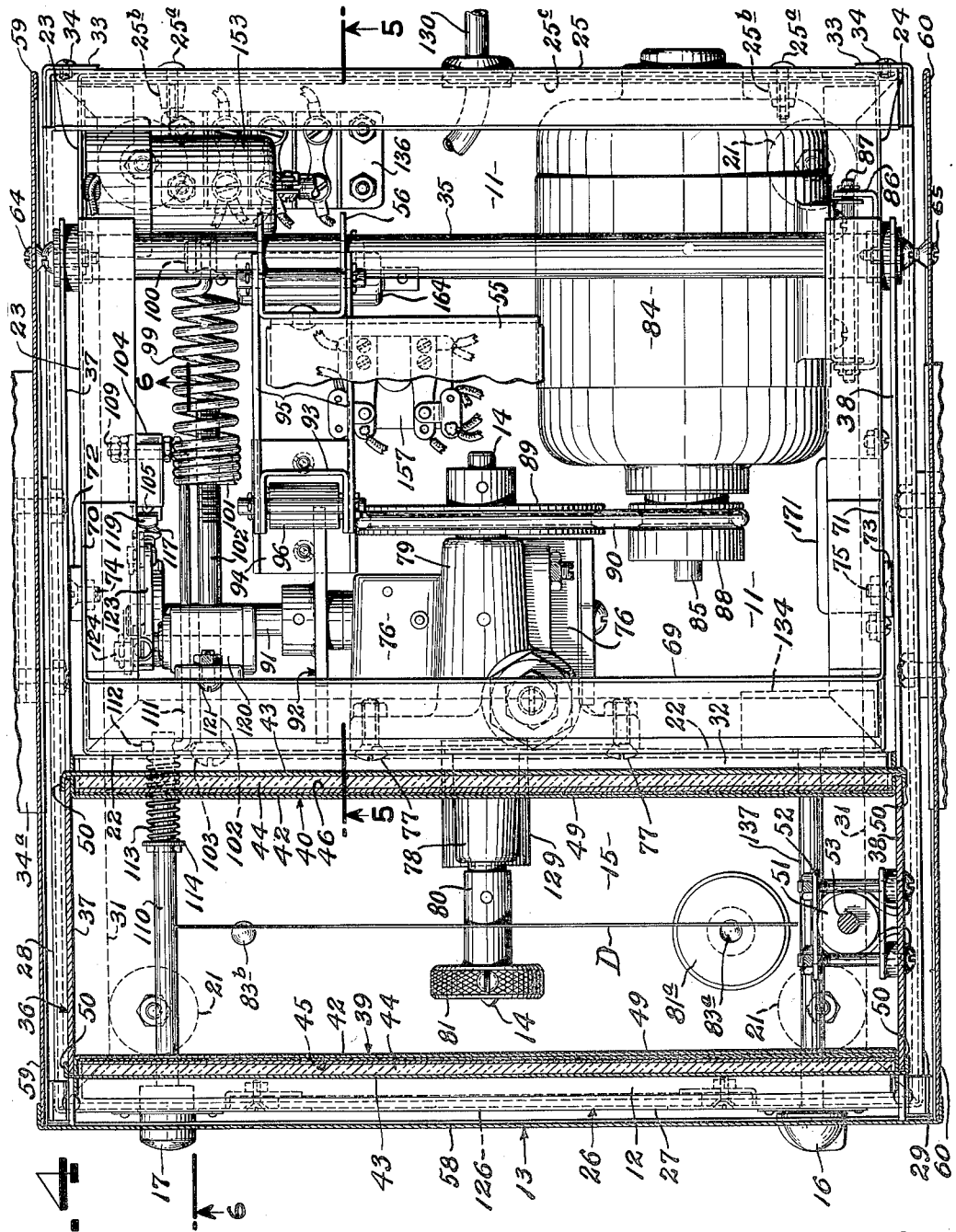
Fig. 4 is a cross-sectional plan view of the same, taken on the broken line 4—4 of Fig. 1.

The forward compartment or well 12 is enclosed by means of a U-shaped member 26 having a front wall 27 and side walls 28, 29, embracing the respective front and sides of the base plate 19 (Figs. 4 and 9). The U-shaped member 26 also comprises continuous inwardly-extending upper and lower flanges 30, 31 which respectively abut the side walls 23, 24 of the rear compartment 11 and engage lower side edge portions of the base plate 19 (Fig. 3).

In order to hold the U-shaped member 26 in place, the upper flange 30 is engaged over the laterally projecting ends of a transverse angle member 32 which is attached to the front surface of the transverse wall 22, the rear ends of the side walls 28, 29 also being provided with inwardly-extending apertured flanges 33 (Fig. 4) which are detachably secured to the ends of the back plate 25 by means of screws 34.

Figure 2:
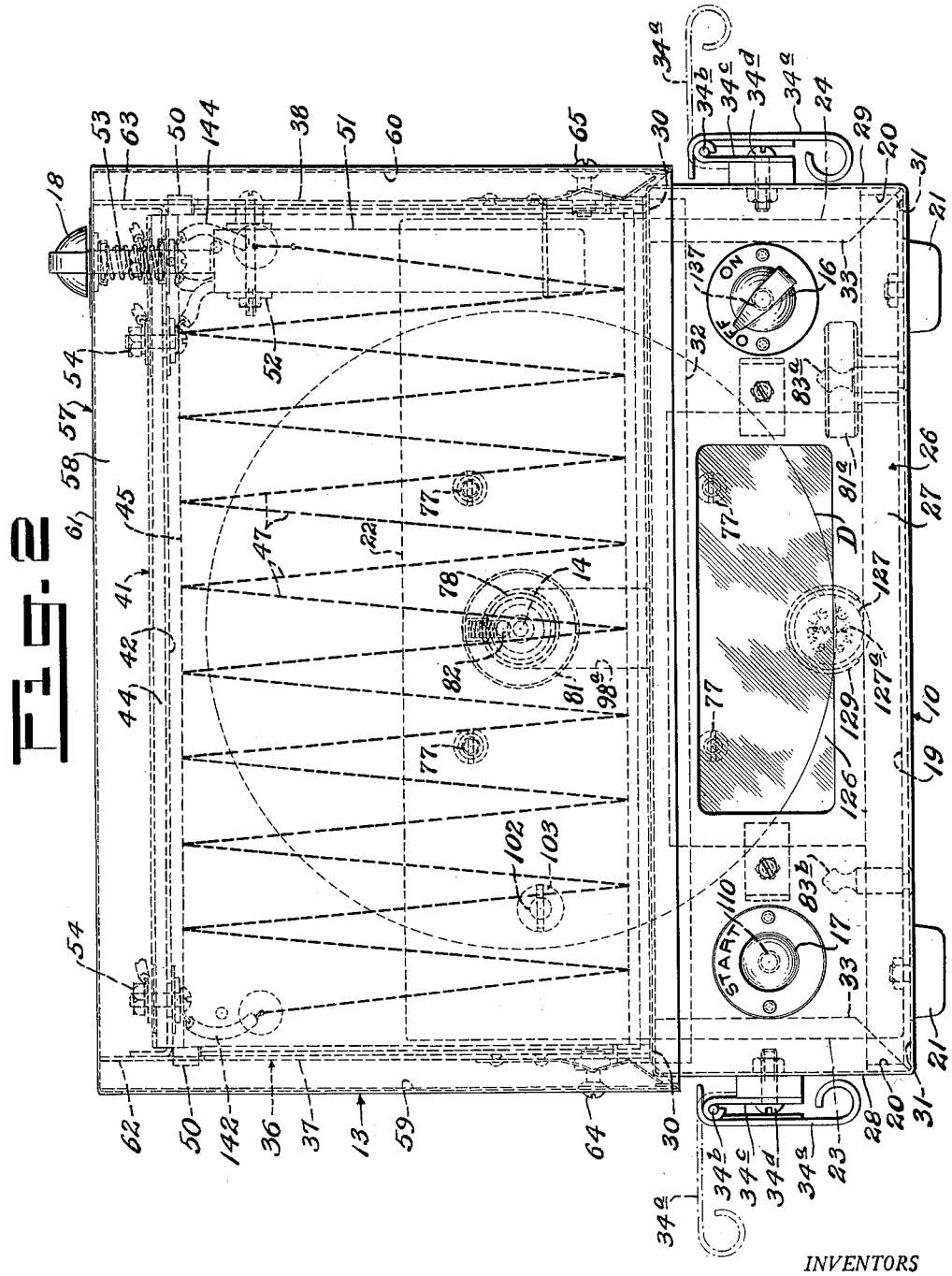
Fig. 2 is a front view of the same.

The machine is preferably provided with a pair of side handles 34a, 34a, which are vertically swingable upon hinge pins 34b, said hinge pins being mounted upon bases 34c which are attached to the sides of the U-shaped member 26 by means of screws 34d (Figs. 2 and 3).

In order to mount the cover 13 swingably upon the body portion 10, provision is made of a horizontal transverse shaft 35 which is rotatably supported in upper rear portions of the side walls 23, 24 of the rear compartment 11 (Figs. 4 and 5).

The cover 13 comprises an inner frame 36 which includes the heating chamber 15 and which is provided with a pair of side arms 37, 38 extending rearwardly from said heating chamber and rigidly secured to opposite ends of the cover shaft 35 outwardly of the side walls 23, 24. It will be seen that the heating chamber 15 is disposed within the front portion of the cover 13, the end walls of said chamber being formed by forward end portions of the side arms 37, 38 (Figs. 3 and 4).

The front and rear walls of the heating chamber 15 are provided by a pair of flat rectangular heaters 39, 40 of the electrical resistance type, which are integrally joined by means of a horizontal top wall 41 (Figs. 1, 3, and 5). The heaters 39, 40 (Figs. 4 and 5) each comprise an inner metal covering 42 and an outer metal covering 43 having a heat insulating sheet 44 therebetween, said inner covering 42 and said insulating sheet 44 being continuous across the top of the heating chamber 15 and forming the top wall 41 (Figs. 3, 4, and 5).

The heaters 39, 40 also have flat heating elements 45, 46, respectively, which comprise loops of resistance wire 47, 48 (Figs. 2 and 3) disposed inwardly of the insulating sheets 44 and separated from the inner metal coverings 42 by means of layers of insulating material 49 (Fig. 5).

It will be seen that the heaters 39, 40 constitute the front transverse portion of the inner frame 36 and are attached to the side arms 37, 38 by means of ears 50 (Figs. 3 and 4) said heaters being so disposed as to occupy vertical positions in equidistant spaced relation to the disk D when the cover 13 is closed.

In order to control the temperature within the heating chamber 15, provision is made of an elongated thermostatic switch 51, of any suitable type (Figs. 1, 3, and 4) which is mounted in a vertical position within the heating chamber 15 and is attached to the side arm 38 by a clamping device 52.

The thermostatic switch 51 is adapted to be adjusted by means of a manually rotatable shaft 53 (Fig. 3) which extends upwardly through an aperture in the top wall 41 and which has the temperature adjusting knob 18 secured thereon.

In order to facilitate connection of the heaters 39, 40 and the thermostatic switch 51 into the electrical circuits of the machine, the top wall 41 of the heating chamber 15 preferably has a plurality of insulated screw terminals 54 mounted therein.

The inner cover frame 36 further comprises an inclined longitudinal top member 55 which is channel-shaped in cross-section and is attached at its front end to the top wall 41 of the heating chamber 15 so as to be disposed approximately midway between the side arms 37, 38. The top member 55 extends rearwardly and is attached at its rear end to the upper end of a channel-shaped arm 56 which is mounted upon the transverse cover shaft 35.

In order to protect and enclose the inner cover frame 36 and the mechanism within the rear machine compartment 11, the cover 13 includes a shield 57 having a vertical front wall 58, vertical side walls 59, 60, and a top wall 61, a portion of said top wall being inclined downwardly toward the rear of the machine. In order to support the cover shield 57, the forward sections of the inner frame side arms 37, 38 are provided with upwardly-extending abutment portions 62, 63 (Figs. 1 and 3) which engage the inner surface of the top wall 61 of said shield 57, while rear portions of the side walls 59, 60 are attached to the side arms 37, 38 a short distance below the cover shaft 35 by means of screws 64, 65. The cover shield 57 is adapted to be retained in place against the abutment portions 62, 63 by means of a latch, which may be in the form of a key-operated lock 66 having a swingable arm 67 adapted to be engaged through an elongated aperture 68 in the top frame member 55. The lock 66 will prevent unauthorized removal of the cover shield 57 and tampering with the machine mechanism. The keys for the lock 66 may, of course, be held by the owner of the machine, a designated service man, or any other person.

It will be seen that the cover shield 57 is of ample lateral dimensions to prevent engagement thereof with the body portion 10 when the cover 13 is in its closed position, the closing movement of said cover being limited by engagement of the lower edges of the side arms 37, 38 with the upper flange 30 of the U-shaped member 26.

In order to substantially close the rear compartment 11 when the cover 13 is in open position, and at the same time to provide clearance for swinging movement of the heater 40 with the cover 13, the transverse wall 22 is provided with a rearwardly offset vertical upward extension 69 having rearwardly-extending end wings 70, 71 attached to the upper edges of the side walls 23, 24, of the rear compartment 11 (Fig. 4).

The outer surfaces of the end wings 70, 71 are provided with fiber spacer blocks 72, 73 which are secured thereto by means of countersunk screws 74, 75. The spacer blocks 72, 73 are for the purpose of preventing the alignment of the side arms 37, 38 during handling and shipment of the machine, and will not normally engage said side arms during operation.

*Operating mechanism*

In order to rotatably support the horizontal spindle 14 and also to perform other machine functions to be described, provision is made of a gear box 76 which is secured in a central position upon the rear surface of the transverse wall 22 by means of mounting screws 77. The gear box 76 has an elongated front bearing 78 which projects forwardly through the transverse wall 22 above the well 12, and a rear bearing 79 located in the rear compartment 11, said bearing being so disposed as to support the spindle 14 in a central horizontal position extending forwardly and rearwardly of the machine.

The record disk D is adapted to be detachably held upon the front end portion of the spindle 14 by a clamping means which comprise a sleeve 80 fixed upon said spindle (Figs. 1 and 4) and an apertured knurled knob 81 which is removably held upon the spindle by means of an inner spring-pressed ball 82 adapted to engage in a peripheral groove 83 of the spindle (Fig. 1). It will thus be seen that the record disk D may readily be placed upon the spindle 14 so as to engage the sleeve 80, the spindle being inserted in the central aperture of said disk, after which the knob 81 may be applied to the spindle outwardly of the disk D. It will be noted that the groove 83 in the spindle 14 is so disposed that the spring-pressed ball 82 will engage an outer inclined wall of the groove 83, thus tending to urge the knob 81 inwardly so as to exert a moderate clamping force which will be sufficient to insure rotation of the disk D with the spindle 14.

Although the disk clamping knob 81 will ordinarily remain sufficiently cool during use to permit it to be comfortably handled, provision may be made of a duplicate spare knob 81a which may be substituted for the knob 81 so as to permit the latter to cool in the event that it should become hot during prolonged use. A pair of vertical supporting studs 83a, 83b are secured to the base plate 19 within the forward compartment 12 for holding the knobs 81 and 81a in readily available positions when not in use.

The spindle 14 is adapted to be driven by means of an electric motor 84 (Fig. 4) which has a horizontal shaft 85 parallel to the spindle 14 and which is swingably mounted in the rear compartment 11 by means of a hinged bracket 86. The bracket 86 has a horizontal pivot pin 87 (Figs. 1 and 4), and is attached to an upper rear portion of the side wall 24.

The forward end of the motor shaft 85 is provided with a driving pulley 88 which is adapted to drive the spindle 14 by means of a relatively large pulley 89 fixed upon the rear end of said spindle and connected to said pulley 88 by means of a belt 90, the weight of the motor 84 maintaining a degree of tension in said belt because of the action of the hinged bracket 86.

The speed of the motor 84 and the relative diameters of the pulleys 88 and 89 will be so selected as to rotate the spindle 14 at a speed which is sufficient to maintain the record disk D flat by the action of centrifugal force when said disk is in a soft and limp condition. It has been found in practice that a speed of rotation of approximately 800 revolutions per minute in the spindle 14 will produce satisfactory operation, although it will be understood that the machine may, if desired, be so constructed that the spindle 14 will be driven at other speeds.

In order to operate the vertically swingable cover 13 and to control the cycle of machine operation, the gear box 76 is provided with a slow speed shaft 91 which is disposed in a transverse position below the spindle 14 and which is operated in a counterclockwise direction thereby, as viewed in Fig. 5, at a speed of approximately 1 revolution in 25 seconds. The slow speed shaft 91 has fixed thereon a cover-lifting cam 92 which is adapted to swing the cover 13 upwardly by means of a linkage comprising a swingable arm 93 pivotally mounted in a bracket 94 on the base plate 19, and a pair of pivoted links 95 connecting the upper end of the arm 93 with an upper portion of the arm 56 on the cover pivot shaft 35 (Figs. 4 and 5). The swingable arm 93 is provided with a roller 96 which serves as a follower for the cover-lifting cam 92 and which will be maintained against the periphery of said cam by the weight of said cover 13.

It will be seen that the cover lifting cam 92 has a circular edge portion 97 which extends over a major part of the periphery of the cam and will provide a dwell interval of approximately 15 seconds during which the cover 13 will be in its raised or open position. The cover lifting cam 92 also has a flat edge portion 98 which will permit the roller or follower 96 to move forwardly, and thus allow the cover 13 to descend so that the heating chamber 15 will embrace the disk D. It will be noted that the lower edge portion of the heater 40 is provided with an upwardly-extending slot 98a (Figs. 2 and 9) which is adapted to receive the front bearing 78 of the gear box 76, and thus will permit the cover 13 to descend to its full extent.

To provide smooth operation of the cover 13 and also to avoid excessive stresses in its operating mechanism, said cover is partially counterbalanced by means of a coil spring 99, the rear end of which is attached to a stud 100 on the arm 56 below the cover pivot shaft 35. The front end of the counterbalancing spring 99 is provided with a tapered base 101 which is adjustably threaded upon the rear end of an elongated adjusting screw 102 having a head 103 whereby said screw is held in an aperture in the transverse wall 22.

Thus, it will be seen that the screw head 103 is accessible at the front of the transverse wall 22 so that the spring 99 may be readily adjusted by means of a screwdriver. The spring 99 will, of course, be so adjusted as to relieve the cover lifting cam 92 of a major portion of the weight of the cover 13, while permitting the cover 13 to close promptly by its own weight when the roller 96 rides onto the flat portions 98 of the cover-lifting cam 92.

In order to permit manual initiation and automatic termination of the machine cycle, the machine is provided with a motor switch 104 (Fig. 6) of a type having an operating button 105 adapted to break a circuit when pressed inwardly and to close said circuit when released. As shown diagrammatically in Fig. 11, the motor switch 104 comprises a pair of contacts 106, 107 to be further described hereinafter with reference to the electrical circuits of the machine.

The motor switch 104 is mounted for forward and rearward swinging movement upon the base plate 19 by means of a bracket 108 having a transverse pivot pin 109, and is disposed opposite and rearwardly of an outer end portion of the slow speed shaft 91. The motor switch 104 is so connected mechanically to the starting button 17 that pressure upon said button will swing said switch rearwardly for closing the contacts 106, 107. This mechanical connection comprises a horizontal shaft 110 upon which the button 17 is integrally secured, said button and said shaft being slidably supported in the front wall 27 of the U-shaped member 26 and in the transverse wall 22, respectively (Fig. 6).

The shaft 110 (Fig. 6) is connected to the motor switch 104 by means of a link 111 having an angular forward end 112 which is disposed in an aperture in said shaft and which is adapted to abut the rear surface of the wall 22. The motor switch 104 will normally be held in a vertical position, however, by means of a coil spring 113 which embraces the shaft 110 and is engaged between the outer surface of the transverse wall 22 and a washer 114 held by a cotter pin in the shaft 110. Thus, after the starting button 17 has been pressed so as to tilt the motor switch 104, it will return to its outer position because of the action of the spring 113, the outward movement of said shaft 110 being limited by engagement of the angular end 112 of the link 111 with the wall 22.

Provision is made of a shut-off cam 115 (Fig. 6) which is adapted to depress the operating button 105 when the motor switch 104 is in its vertical position, said cam being secured upon the outer end of the slow speed shaft 91 by means of a set screw 116, and having a projecting cam piece in the form of a headed screw 117 adjustably held by means of a jam-nut 118. The head of the screw 117 is adapted to engage the upper end of a leaf-spring 119 which is attached at its lower end to the motor switch 104 and which is disposed in engagement with the operating button 105. The leaf spring 119 is so constructed as to lie in an outward position when disengaged from the headed screw 117, as shown in Fig. 7, thus permitting the operating button 105 to occupy an outward position (in which the switch contacts 106, 107 are closed).

It will be understood, however, that the effective force of the coil spring 113 is relatively so strong that when the screw 117 engages the leaf-spring 119, the motor switch 104 will remain in a vertical position and thus permit the action of the screw 117 to depress the operating button 105, as shown in Fig. 6 (and thus open the switch contacts 106, 107).

In order to record the number of cycles performed by the machine, and thus serve as a convenient means for indicating the number of disks reprocessed, provision is made of a suitable counter 120 (Fig. 6) which is secured to the inner surface of the upper wall extension 69 by means of screws 121, and which is observable through an aperture 122 in said extension. The counter 120 is preferably of the type which is provided with a rearwardly-extending oscillatable operating arm 123, said operating arm being connected to a lateral crank pin 124 on the shut-off cam 115 by means of a link 125. Thus, each machine cycle and attendant revolution of the slow-speed shaft 91 will cause the counter 120 to register an additional unit.

Visual inspection of the record disk D will be permitted while the cover 13 is closed by means of a window 126 which is provided in the central portion of the front wall 27 of the forward compartment 12 (Figs. 2 and 9).

In order to illuminate a portion of the disk D when said disk is of translucent or transparent material, and also to serve as a reminder that the machine is turned on, provision is made of a pilot lamp 127 (Figs. 1 and 2), which is held in a socket 128 in the rear compartment 11 and which projects forwardly through an aperture in the lower central portion of the wall 22 opposite the window 126, a curved upper shield 129 being provided to obstruct upward rays of light which might otherwise annoy the operator when the cover 13 is open.

The pilot lamp 127 is preferably of the type which has a clear glass bulb, so that the machine operator may readily judge the condition of the record disk D by the apparent clarity of the lamp filament as seen through said disk. The filament will, of course, appear blurred and distorted when grooves are present in the disk D, due to the diffusing effect of said grooves, while the lamp filament may be clearly seen after the grooves have been obliterated from the disk. The customary indicia 127a (Figs. 2 and 3) which are applied to the end of the lamp bulb by the manufacturer in order to show its rating, will also be seen with varying degrees of definition depending upon the condition of the record grooves.

It will be understood, however, that the automatic features of the disk reprocessing machine will render unnecessary any constant or repeated inspection of the disks being reprocessed.

*Electrical circuits (Fig. 11)*

The machine is provided with a connecting cord 130 which enters the rear compartment 11 through an aperture in the back plate 25, and which has an outer two-prong plug 131 for connection to a suitable source of electric current. The connecting cord 130 has a pair of conductors 132, 133, the former being connected to a main switch 134 and the latter being connected to a return conductor 135 which serves as the equivalent of a common ground for the various machine circuits.

In practice, provision may be made of a connecting block 136 (Figs. 1 and 4) to which the cord 130 is connected and which will serve as a convenient means for connecting other portions of the machine circuits.

The main switch 134 is operatively connected to the switch knob 16 by means of a shaft 137 (Fig. 4) which is rotatably supported in the front wall 27 and the transverse wall 22, and is provided with a mechanically connected but electrically separate momentary contact switch 138 (Fig. 11) to be further described hereinafter.

The heaters 39, 40, the thermostat 51 and the main switch 134 are all series-connected so as to provide a heater circuit connected to the conductors 132, 133, this being accomplished by means of a conductor 139 connecting the main switch 134 to the thermostat 51, a conductor 140 connecting the thermostat 51 to the heater 40, conductors 141 and 142 having an interposed high-temperature fuse 143 connecting the heater 40 to the heater 39, and a conductor 144 connecting the heater 39 to the return wire 135.

Thus, it will be seen that, when the main switch 134 is closed, the heaters 39, 40 will be energized until such time as the heating chamber 15 reaches a predetermined temperature, at which time the thermostatic switch 51 will open. The fuse 143 is for the purpose of protecting the machine against abnormally high temperatures, and is so constructed as to break the heater circuit in the event of an accidental and excessive rise in temperature.

A convenient means for use in testing the heaters 39, 40 is provided in the form of a test lamp 145 which is located in a circuit which includes a conductor 146 connected to the conductor 141, and a conductor 147 connected to the return conductor 135. The test lamp 145 may be supported in a socket 148, attached to the top member 55 of the inner cover frame 36 (Fig. 1). When the main switch 134 and the thermostatic switch 51 are closed, a proper operating condition of the heaters 39, 40 will be indicated by a dim glow in the test lamp 145. A defect in the heaters 39, 40 will be indicated either by failure of the test lamp 145 to burn at all, or by a bright illumination thereof. The test lamp 145 may also be used in testing the thermostatic switch 51, inasmuch as the operation of said test lamp depends upon the operation of said switch 51.

The pilot lamp 127 is connected directly across the conductor 139 and the return conductor 135 by means of conductors 149, 150, thus serving to indicate the condition of the main switch 134 when the plug 131 is connected to a source of current.

The motor 84 is provided with a pair of lead wires 151, 152 which are adapted to be connected into a motor circuit of the machine by means of a separable plug and socket device 153 (Figs. 4 and 11). The plug and socket device 153 has a conductor 154 for connecting the motor wire 151 to the return conductor 135, and a conductor 155 for connecting the motor wire 152 to the contact of the motor switch 104, whereby operation of the motor 84 will be subject to operation of said switch 104.

The other contact 106 of the motor switch 104 is not connected directly to the main switch 134, however, but is connected by means of a wire 155a to one arm 156 of a two-arm relay 157 which is provided for the purpose of preventing operation of the machine during a warmingup period which occurs just after the main switch 134 has been turned on, and in which the heaters 39, 40 will be too cool for effective use.

The relay arm 156 is normally in engagement with a relay contact 158 which is connected to the main switch conductor 139 by means of a conductor 159, whereby the motor switch 104 may be effective to energize the motor 84. However, when the operator turns on the main switch 134, the momentary contact switch arm 138 will be caused to brush across a contact 160 immediately after said main switch has established contact between the conductors 132 and 139.

This action will momentarily provide a circuit through an actuating coil 161 of the relay 157, said circuit including a conductor 162 between the load side of the thermostatic switch 51 and the contact 160, and a conductor 163 between the momentary contact switch arm 138 and one side of the relay coil 161. The other side of the relay coil 161 is connected in series with a resistor 164 to the ground conductor 135 by means of wires 165, 166, in order to permit a limited current to flow through said relay coil 161 when the machine is being operated upon direct current.

However, when the machine is to be operated upon alternating current, the resistor 164 will be short-circuited by means of a jumper 167 which is adapted to connect the conductor 154 to the wire 165 through a conductor 168. The jumper 167 may conveniently be included in the plug and socket device 153. Thus, it will be understood that the machine may be readily converted for A. C. or D. C. operation by the provision of interchangeable A. C. and D. C. motors 84, the jumper 167 being included only in a connecting plug attached to the A. C. motor.

Returning now to the relay 157, it will be seen that the operation of the momentary contact switch 138 will energize the relay coil 161 so as to separate the relay arm 156 from the contact 158 and thus prevent the operation of the motor 84. Since this action is only momentary, however, provision is made of a relay holding circuit which will be effective when the heaters 39, 40 are below their proper operating temperature and the thermostatic switch is closed, and which comprises a second relay arm 169 adapted to engage a relay contact 170 when the coil 161 is energized. The arm 169 is connected to one side of said relay coil through the conductor 163, while said contact 170 is connected to the load side of the thermostatic switch 51 through the conductor 162. Thus, once the relay 157 has been actuated by the momentary contact switch 138, the second relay arm 169 will establish a circuit through the relay coil 161 and the thermostatic switch 51, said circuit being maintained so as to hold the motor circuit open as long as said thermostatic switch remains closed.

When the heaters 39, 40 have attained a temperature which is sufficient to reprocess a record disk efficiently, the thermostatic switch 51 will open, thus breaking the circuit through the relay coil 161 and permitting the relay arm 156 to close against the contact 158 so as to allow a machine cycle to be initiated when the motor switch 104 is operated.

The thermostatic switch 51 will, of course, close at intervals in order to maintain a proper operating temperature in the heaters 39, 40. Such closing action will be ineffective to disable the motor circuit, however, inasmuch as the relay holding circuit through the second relay arm 169 can be established only by operation of the momentary contact switch 138.

In order to improve the operation of the thermostatic switch 51, provision is preferably made of a capacitor 171 which is connected across said switch by means of wires 172, 173 attached to the conductors 139, 162, respectively.

Operation

In preparing the machine for use, the plug 131 will first be connected to a suitable source of power and the knob 16 will be turned so as to close the main switch 134. Inasmuch as the heaters 39, 40 will be cool at this time, the thermostatic switch 51 will be in a closed condition so that the heaters 39, 40 will be energized and the relay 157 will hold the circuit of the motor 84 open, said circuit having first been opened by the action of the momentary contact switch 138 attendant upon operation of the main switch 134.

During the preliminary warming-up period of the heaters 39, 40 operation of the motor switch 104 will be ineffective to start operation of the motor 84. As soon as the heaters 39, 40 have reached their proper operating temperature, however, the thermostatic switch 51 will open and thus deenergize the relay coil 161.

If this occurs when the machine is in condition to initiate a machine cycle (in which condition the cover 13 is open, the motor switch 104 is in a vertical position, and the shut-off cam holds the contacts 106, 107 disconnected by means of the spring 119 and the operating button 105) the operator may start the motor 84 by pressing the button 17. However, if the relay coil 161 should become deenergized when the machine is in a condition corresponding to an intermediate point in the machine cycle (as in Fig. 8, for example) the contacts 106, 107 would already be connected, thus causing the motor 84 to start automatically and complete the machine cycle. At the end of the cycle, the cover 13 will, of course, be in open position.

Thus, a proper operating temperature of the heaters 39, 40 may be indicated to the user by the starting of the operation of the motor 84.

A used record disc D to be reprocessed will then be placed upon the spindle 14 and the knob 81 applied to said spindle so as to clamp the disk D in place thereon. The operator will then initiate a machine reprocessing cycle by pressing the starting button 17 so as to tilt the motor switch 104 into the position shown in Fig. 7— thus starting the motor 84. The latter will, of course, rotate the spindle 14 and the disk D thereon at a rapid rate, while simultaneously rotating the slow speed shaft 91 in a counter-clockwise direction as viewed in Figs. 6, 7, and 8.

The starting button 17 will be held inwardly manually for a short time in order to permit the projecting cam screw 117 to swing out of the path of the leaf spring 119 on the motor switch 104 whereupon the button 17 may be released so as to permit the coil spring 113 to return the motor switch 104 to a vertical position. The contacts 106, 107 will remain connected, however, until the end of the machine cycle, when the projecting cam screw 117 will have made a complete revolution and again engaged the leaf spring 119 so as to disconnect the motor switch contacts 106, 107.

The machine cover 13 will close at the beginning of the machine cycle, at which time the cam follower 96 will enter upon the flat edge portion 98 of the cover lifting cam 92. The rotating disk D will be subjected to the heat radiated by the heaters 39, 40 as long as the cover 13 is closed. The internal strains in the material of the disk D will be relieved during this period, at the end of which the cam follower 96 will ride outwardly upon the circular cam portion 97, thus opening and holding the cover 13 so that the disk D will no longer be under the influence of the heaters 39, 40.

The circular edge portion 97 of the cam 92 will provide a cooling period during which the rotation of the disk D will be continued, at the end of which period termination of the machine cycle will occur as described above. It will be understood that the cooling period will be of sufficient length to permit the disk D to recover its original stiffness, after which said disk may be removed and replaced by another disk to be reprocessed.

After the machine has been in operation for a short time, the parts surrounding the forward compartment 12 and the heaters 39, 40 will have become heated to such a point that it may be desirable to adjust the temperature control knob 18 to a slightly lower setting in order to maintain the proper operating temperature in the heating chamber 15. An excessive temperature in the heating chamber 15 may be indicated, for example, by a slight warping or cupping of the disks D, and may also be indicated by a too-rapid disappearance of the record grooves as observed through the window 126.

In the event that prolonged use of the machine should cause the clamping knob 81 to become too hot for comfortable handling, the operator may lay said knob aside temporarily so as to permit it to cool while using the spare knob 81a for clamping the disks upon the spindle 14.

When the operation of the machine is to be discontinued, the operator will merely turn the knob 16 so as to disconnect the main switch 134. The pilot lamp 127 will, of course, serve as a warning against leaving the machine turned on.

Inasmuch as the counter 120 will register the number of cycles performed by the machine, said counter will provide an accurate indication of the number of disks reprocessed.

Although it has been found in practice that the machine requires very little maintenance service, access to the mechanism in the rear compartment 11 may readily be had merely by releasing the lock 66 and removing the screws 64, 65, so as to permit the cover shield 57 to be removed from the inner cover frame 36.

In the event that the heaters 39, 40 are suspected of being out of order, a test lamp may be inserted in the socket 148 while the heater conductors 140 and 144 are energized. As hereinbefore described, a proper operating condition of the heaters 39, 40 will be indicated by a dim glow in the test lamp 145, while any other condition of the lamp will indicate that one or both of said heaters is out of order.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all modifications and embodiments coming within the scope of the following claims.

Having thus fully described the invention, what is claimed as new, and for which it is desired to secure Letters Patent, is:

1. In a machine for restoring used thermoplastic phonograph record disks in which grooves have been impressed; a combination of a rotatably mounted holding means for engaging the central portion of a record disk and supporting the disk for rotation about its normal axis, a heating chamber for heating said record disk to erase said grooves therefrom, means mounting said heating chamber for movement into effective position wherein it embraces said disk, and into ineffective position wherein it is separated from the disk, drive means for rotating said holding means and the disk thereon to maintain the disk flat by centrifugal force while the disk is in a heated condition, and means comprising a thermostatic device for holding said drive means inoperative while the temperature of said heating chamber is below a predetermined value.

2. In a machine for restoring used thermoplastic phonograph record disks in which grooves have been impressed; the combination of a rotatably mounted holding means for engaging the central portion of the record disk and supporting the disk in a vertical plane for rotation about its normal axis, a heating chamber for heating said record disk to erase said grooves therefrom, means mounting said heating chamber for movement into an effective position wherein it embraces said disk, and into ineffective position wherein it is separated from the disk, electric motor drive means for rotating said holding means and the disk thereon to maintain the disk flat by centrifugal force while the disk is in a heated condition, an energizing circuit for said motor, a switch in said circuit, a slow speed shaft operatively connected to said drive means, mechanism comprising a first cam on said slow speed shaft for moving said heating chamber, and mechanism comprising a second cam on said slow speed shaft for operating said switch to control said drive means.

3. The invention as defined in claim 2 including manually-operable means for actuating said switch at the beginning of a machine cycle.

4. In a machine for restoring used thermoplastic phonograph record disks in which grooves have been impressed; the combination of a rotatably mounted holding means for engaging the central portion of a record disk and vertically supporting the disk for rotation about its normal axis, a heating chamber for heating said record disk to erase said grooves therefrom, vertically swingable means supporting said heating chamber for movement into an effective position wherein said chamber embraces a portion of said disk, and into an ineffective position wherein said chamber is separated from the disk, adjustable resilient means for partially counterbalancing the weight of said supporting means and the heating chamber thereon, and drive means for rotating said holding means and the disk thereon to maintain the disk flat by centrifugal force while the disk is in a heated condition.

5. In a machine for restoring used thermoplastic phonograph record disks in which sound tracks have been impressed; the combination of a body portion having a shallow forward well, a rotatably mounted holding means for engaging the central portion of a record disk and supporting the disk for rotation in a vertical plane about its normal axis with the lower portion of the disk disposed in said well, a vertically swingable cover for said body portion, said cover being mounted upon a horizontal shaft supported by said body portion, the forward portion of said cover having a heating chamber for enclosing the remainder of said disk and heating said record disk to erase said grooves therefrom when said cover is closed, said heating chamber being ineffective upon the disk when said cover is open, and drive means for rotating said holding means and the disk thereon to maintain the disk flat by centrifugal force while the disk is in a heated condition.

6. In a machine for restoring to their original flat-surfaced condition used light transmitting thermoplastic phonograph record disks in which grooves have been impressed; the combination of a holding means for engaging the central portion of a record disk and supporting said disk in a vertical plane, means comprising a heater for erasing the grooves in said disk, a lamp disposed behind said disk to permit the erasure of said grooves to be observed from the front of and through said disk, said lamp comprising a light transmitting bulb having indicia thereon, whereby the apparent distortion of the image of said indicia as viewed through said disk will be a sensitive indication of the degree of restoration of the disk to its original flat-surfaced condition.

NILS T. ALMQUIST.
ANTHONY C. DE NAPOLI, Jr.

REFERENCES CITED

The following references are of record in the file of this patent:

UNITED STATES PATENTS

| Number | Name | Date |
| --- | --- | --- |
| 1,351,865 | Nicol | Sept. 7, 1920 |
| 2,265,032 | Feyrer | Dec. 2, 1941 |
| 2,340,161 | Van Deventer | Jan. 25, 1944 |
| 2,388,127 | Downing | Oct. 30, 1945 |